US011803973B1

(12) United States Patent
Xu et al.

(10) Patent No.: US 11,803,973 B1
(45) Date of Patent: Oct. 31, 2023

(54) MULTI RESOLUTION MOTION DETECTION

(71) Applicant: SimpliSafe, Inc., Boston, MA (US)

(72) Inventors: Monica Xu, Cambridge, MA (US); Shekhar Bangalore Sastry, Arlington, MA (US); Nicholas Setzer, Boston, MA (US)

(73) Assignee: SimpliSafe, Inc., Boston, MA (US)

( * ) Notice: Subject to any disclaimer, the term of this patent is extended or adjusted under 35 U.S.C. 154(b) by 0 days.

(21) Appl. No.: 18/172,803

(22) Filed: Feb. 22, 2023

Related U.S. Application Data

(63) Continuation of application No. 18/156,529, filed on Jan. 19, 2023.

(51) Int. Cl.
*G06T 7/215* (2017.01)

(52) U.S. Cl.
CPC .... *G06T 7/215* (2017.01); *G06T 2207/10048* (2013.01); *G06T 2207/20016* (2013.01); *G06T 2207/20021* (2013.01); *G06T 2207/30232* (2013.01)

(58) Field of Classification Search
CPC .......... G06T 7/215; G06T 2207/10048; G06T 2207/20016; G06T 2207/30232
See application file for complete search history.

(56) References Cited

U.S. PATENT DOCUMENTS

| 10,333,923 B2 * | 6/2019 | Johri ..................... G06F 21/36 |
| 10,504,240 B1 * | 12/2019 | Solh ..................... H04N 23/73 |
| 2005/0198600 A1 * | 9/2005 | Hasegawa ............ G06F 30/398 |
| | | 716/112 |

* cited by examiner

*Primary Examiner* — Sam Bhattacharya
(74) *Attorney, Agent, or Firm* — Schwegman Lundberg & Woessner, P.A.

(57) ABSTRACT

Motion detection is performed using layouts of different resolutions. A plurality of layouts at different resolutions are generated using an image. Sets of bounding boxes for the different layouts are generated based on areas indicative of motion for the respective layout. The different sets of bounding boxes are combined and motion of one or more objects represented in the image is detected based on combined set of bounding boxes.

20 Claims, 15 Drawing Sheets

MULTI RESOLUTION MOTION DETECTION

CROSS-REFERENCE TO RELATED APPLICATION

This application is a continuation of U.S. patent application Ser. No. 18/156,529, filed Jan. 19, 2023, which is incorporated by reference herein in its entirety.

BACKGROUND

Security systems can employ cameras to capture and record image data of a monitored space. Security systems can also use image data to automatically detect motion in the monitored space. Security systems, for example, can use bounding boxes, which are rectangles around respective detected objects, for motion detection.

SUMMARY

This disclosure describes a method comprising: dividing an image into a first layout and a second layout, the image representing one or more objects, the first layout including a first set of blocks of pixels of a first uniform size, the second layout including a second set of blocks of pixels of a second uniform size, and the first uniform size being greater than the second uniform size; generating a first set of bounding boxes based on a first set of areas in the first layout indicative of motion; generating a second set of bounding boxes based on a second set of areas in the second layout indicative of motion; combining the first set of bounding boxes and the second set of bounding boxes to generate a combined set of bounding boxes; and detecting motion of the one or more objects represented in the image based on the combined set of bounding boxes.

This disclosure also describes a system including an imager sensor to generate an image. The system includes a processor coupled to the image sensor, the processor configured to: dividing an image into a first layout and a second layout, the image representing one or more objects, the first layout including a first set of blocks of pixels of a first uniform size, the second layout including a second set of blocks of pixels of a second uniform size, and the first uniform size being greater than the second uniform size; generating a first set of bounding boxes based on a first set of areas in the first layout indicative of motion; generating a second set of bounding boxes based on a second set of areas in the second layout indicative of motion; combining the first set of bounding boxes and the second set of bounding boxes to generate a combined set of bounding boxes; and detecting motion of the one or more objects represented in the image based on the combined set of bounding boxes.

This disclosure further describes a method comprising: dividing an image into a first layout defined by a first resolution and a second layout defined by a second resolution; generating a plurality of first resolution bounding boxes indicative of motion using the first layout; generating a second resolution bounding box indicative of motion using the second layout; determining that the plurality of first resolution bounding boxes overlap with the second resolution bounding box; merging the plurality of first resolution bounding boxes and the second resolution bounding box to generate a single box encompassing areas defined by the plurality of first resolution bounding boxes and the second resolution bounding box; and detecting motion of a single object based on the single box.

BRIEF DESCRIPTION OF THE DRAWINGS

Additional examples of the disclosure, as well as features and advantages thereof, will become more apparent by reference to the description herein taken in conjunction with the accompanying drawings which are incorporated in and constitute a part of this disclosure. The figures are not necessarily drawn to scale.

DETAILED DESCRIPTION

Figure 1:
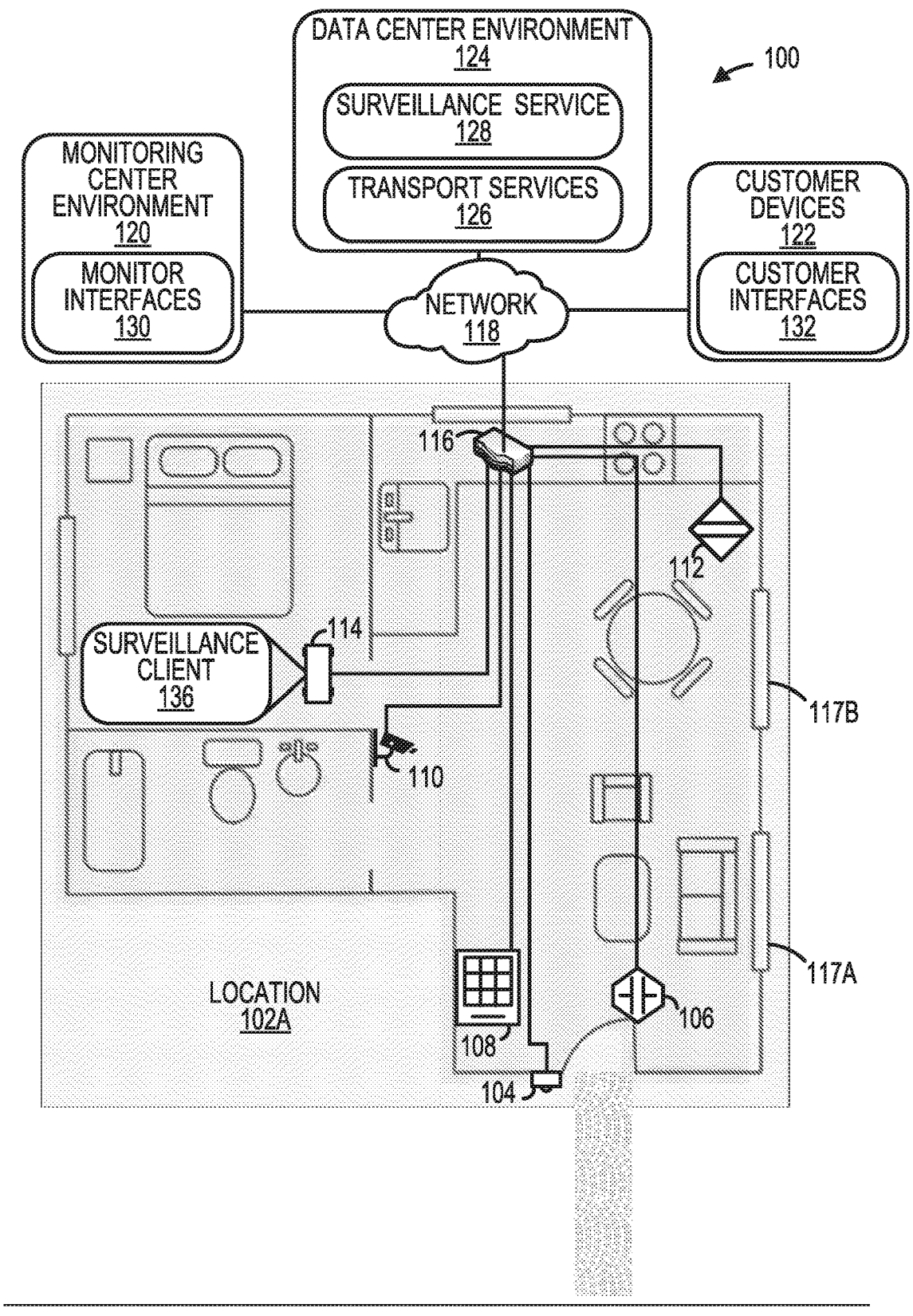
FIG. 1 is a schematic diagram of a security system, according to some examples described herein.

For the purposes of promoting an understanding of the principles of the present disclosure, reference will now be made to the examples illustrated in the drawings, and specific language will be used to describe the same. It will nevertheless be understood that no limitation of the scope of the examples described herein is thereby intended.

Conventional motion detection systems can operate using bounding boxes from a single layout with a pre-set resolution and thus can create motion bounding boxes for objects of only a certain size or distance from the camera. Certain sized or distance objects may be detected using a higher resolution, and other sized or distance objects may be detected using a lower resolution. For example, bounding boxes from a lower resolution layout can have difficulty detecting larger objects or objects closer to the camera. Therefore, these conventional motion detection systems are not robust to variations in object size and distance.

Techniques for motion detection using layouts at different resolutions is described herein. A plurality of layouts (e.g., set of pixel blocks) can be generated from an image, individual layouts with a different resolution. Sets of bounding boxes for individual layouts can be generated based on areas indicative of motion for the respective layout. The sets of bounding boxes for the different layouts can be combined and motion of one or more objects represented in the image is detected based on the combined sets of bounding boxes. As described in further detail below, detecting motion using layouts of different resolution can improve motion detection accuracy by being able to detect objects of different sizes and distances from the camera.

FIG. 1 is a schematic diagram of a security system in accordance with some examples. As shown in FIG. 1, the system 100 includes a monitored location 102A, a monitoring center environment 120, a data center environment 124, one or more customer devices 122, and a communication network 118. Each of the monitored location 102A, the monitoring center 120, the data center 124, the one or more customer devices 122, and the communication network 118 includes one or more computing devices (e.g., as described below with reference to FIG. 13). The one or more customer devices 122 are configured to host one or more customer interface applications 132. The monitoring center environment 120 is configured to host one or more monitor interface applications 130. The data center environment 124 is configured to host a surveillance service 128 and one or more transport services 126. The location 102A includes image capture devices 104 and 110, a contact sensor assembly 106, a keypad 108, a motion sensor assembly 112, a base station 114, and a router 116. The base station 114 hosts a surveillance client 136.

In some examples, the router 116 is a wireless router that is configured to communicate with the devices disposed in the location 102A (e.g., devices 104, 106, 108, 110, 112, and 114) via communications that comport with a communications standard such as any of the various Institute of Electrical and Electronics Engineers (IEEE) 108.11 standards. As illustrated in FIG. 1, the router 116 is also configured to communicate with the network 118. It should be noted that the router 116 implements a local area network (LAN) within and proximate to the location 102A by way of example only. Other networking technology that involves other computing devices is suitable for use within the location 102A. For instance, in some examples, the base station 114 can receive and forward communication packets transmitted by the image capture device 110 via a point-to-point personal area network (PAN) protocol, such as BLUETOOTH. Other wired, wireless, and mesh network technology and topologies will be apparent with the benefit of this disclosure and are intended to fall within the scope of the examples disclosed herein.

Continuing with the example of FIG. 1, the network 118 can include one or more public and/or private networks that support, for example, internet protocol (IP). The network 118 may include, for example, one or more LANs, one or more PANs, and/or one or more wide area networks (WANs). The LANs can include wired or wireless networks that support various LAN standards, such as a version of IEEE 108.11 and the like. The PANs can include wired or wireless networks that support various PAN standards, such as BLUETOOTH, ZIGBEE, and the like. The WANs can include wired or wireless networks that support various WAN standards, such as Code Division Multiple Access (CMDA), Global System for Mobiles (GSM), and the like. The network 118 connects and enables data communication between the computing devices within the location 102A, the monitoring center environment 120, the data center environment 124, and the customer devices 122. In at least some examples, both the monitoring center environment 120 and the data center environment 124 include network equipment (e.g., similar to the router 116) that is configured to communicate with the network 118 and computing devices collocated with or near the network equipment.

Continuing with the example of FIG. 1, the data center environment 124 can include physical space, communications, cooling, and power infrastructure to support networked operation of computing devices. For instance, this infrastructure can include rack space into which the computing devices are installed, uninterruptible power supplies, cooling plenum and equipment, and networking devices. The data center environment 124 can be dedicated to the security system 100, can be a non-dedicated, commercially available cloud computing service (e.g., MICROSOFT AZURE, AMAZON WEB SERVICES, GOOGLE CLOUD, or the like), or can include a hybrid configuration made up of dedicated and non-dedicated resources. Regardless of its physical or logical configuration, as shown in FIG. 1, the data center environment 124 is configured to host the surveillance service 128 and the transport services 126.

Continuing with the example of FIG. 1, the monitoring center environment 120 can include a plurality of computing devices (e.g., desktop computers) and network equipment (e.g., one or more routers) connected to the computing devices and the network 118. The customer devices 122 can include personal computing devices (e.g., a desktop computer, laptop, tablet, smartphone, or the like) and network equipment (e.g., a router, cellular modem, cellular radio, or the like). As illustrated in FIG. 1, the monitoring center environment 120 is configured to host the monitor interfaces 130 and the customer devices 122 are configured to host the customer interfaces 132.

Continuing with the example of FIG. 1, the devices 104, 106, 110, and 112 are configured to acquire analog signals via sensors incorporated into the devices and generate digital sensor data based on the acquired signals. In some examples, the devices 104, 106, 110, and 112 are configured to perform additional data processing (as described in further detail below) and communicate (e.g. via a wireless link with the router 116) information to the base station 114. The type of sensor data generated and communicated by these devices varies along with the type of sensors included in the devices. For instance, the image capture devices 104 and 110 can acquire ambient light, generate frames of image data based on the acquired light, and communicate the frames to the base station 114, although the pixel resolution and frame rate may vary depending on the capabilities of the devices. In some examples, the image capture devices 104 and 110 can also perform motion detection using bounding boxes of different resolutions as described in further detail below. As shown in FIG. 1, the image capture device 104 has an FOV (field of view) that originates proximal to a front door of the location 102A and can acquire images of a walkway, highway, and a space between the location 102A and the highway. The image capture device 110 has an FOV that originates proximal to a bathroom of the location 102A and can acquire images of a living room and dining area of the location 102A. The image capture device 110 can further acquire images of outdoor areas beyond the location 102A through windows 117A and 117B on the right side of the location 102A.

Continuing with the example of FIG. 1, the contact sensor assembly 106 includes a sensor that can detect the presence or absence of a magnetic field generated by a magnet when the magnet is proximal to the sensor. When the magnetic field is present, the contact sensor assembly 106 generates Boolean sensor data specifying a closed state. When the magnetic field is absent, the contact sensor assembly 106 generates Boolean sensor data specifying an open state. In either case, the contact sensor assembly 106 can communicate sensor data indicating whether the front door of the location 102A is open or closed to the base station 114. The motion sensor assembly 112 can include an audio emission device that can radiate sound (e.g., ultrasonic) waves and an audio sensor that can acquire reflections of the waves. When the audio sensor detects the reflection because no objects are in motion within the space monitored by the audio sensor, the motion sensor assembly 112 generates Boolean sensor data specifying a still state. When the audio sensor does not detect a reflection because an object is in motion within the monitored space, the motion sensor assembly 112 generates Boolean sensor data specifying an alert state. In either case, the motion sensor assembly 112 can communicate the sensor data to the base station 114. It should be noted that the specific sensing modalities described above are not limiting to the present disclosure. For instance, as one of many potential examples, the motion sensor assembly 112 can base its operation on acquisition of changes in temperature using infrared sensing rather than changes in reflected sound waves.

Continuing with the example of FIG. 1, the keypad 108 is configured to interact with a user and interoperate with the other devices disposed in the location 102A in response to interactions with the user. For instance, in some examples, the keypad 108 is configured to receive input from a user that specifies one or more commands and to communicate the specified commands to one or more addressed devices or processes. These addressed devices or processes can include one or more of the devices disposed in the location 102A and/or one or more of the monitor interfaces 130 or the surveillance service 128. The commands can include, for example, codes that authenticate the user as a resident of the location 102A and/or codes that request activation or deactivation of one or more of the devices disposed in the location 102A. Alternatively or additionally, in some examples, the keypad 108 includes a user interface (e.g., a tactile interface, such as a set of physical buttons or a set of virtual buttons on a touchscreen) configured to interact with a user (e.g., receive input from and/or render output to the user). Further still, in some examples, the keypad 108 can receive responses to the communicated commands and render the responses via the user interface as visual or audio output.

Continuing with the example of FIG. 1, the base station 114 is configured to interoperate with other security system devices disposed at the location 102A to provide local command and control and store-and-forward functionality via execution of the surveillance client 136. In some examples, to implement store-and-forward functionality, the base station 114, through execution of the surveillance client 136, receives sensor data, packages the data for transport, and stores the packaged sensor data in local memory for subsequent communication. This communication of the packaged sensor data can include, for instance, transmission of the packaged sensor data as a payload of a message to one or more of the transport services 126 when a communication link to the transport services 126 via the network 118 is operational. In some examples, packaging the sensor data can include motion detection using bounding boxes of different resolutions as described in further detail below. To implement local command and control functionality, the base station 114 executes a variety of programmatic operations through execution of the surveillance client 136 in response to various events. Examples of these events can include reception of commands from the keypad 108, reception of commands from one of the monitor interfaces 130 or the customer interface application 132 via the network 118, or detection of the occurrence of a scheduled event. The programmatic operations executed by the base station 114 via execution of the surveillance client 136 in response to events can include activation or deactivation of one or more of the devices 104, 106, 108, 110, and 112; sounding of an alarm; reporting an event to the surveillance service 128; and communicating location data to one or more of the transport services 126 to name a few operations. The location data can include data specifying sensor readings (sensor data), configuration data of any of the devices disposed at the location 102A, commands input and received from a user (e.g., via the keypad 108 or a customer interface 132), or data derived from one or more of these data types (e.g., filtered sensor data, summarizations of sensor data, event data specifying an event detected at the location via the sensor data, etc.).

Continuing with the example of FIG. 1, the transport services 126 are configured to receive messages from monitored locations (e.g., the location 102A), parse the messages to extract payloads included therein, and store the payloads and/or data derived from the payloads within one or more data stores hosted in the data center environment 124. In some examples, the transport services 126 expose and implement one or more application programming interfaces (APIs) that are configured to receive, process, and respond to calls from base stations (e.g., the base station 114) via the network 118. Individual instances of a transport service within the transport services 126 can be associated with and specific to certain manufactures and models of location-based monitoring equipment (e.g., SIMPLISAFE equipment, RING equipment, etc.). The APIs can be implemented using a variety of architectural styles and interoperability standards. For instance, in one example, the API is a web services interface implemented using a representational state transfer (REST) architectural style. In this example, API calls are encoded in Hypertext Transfer Protocol (HTTP) along with JavaScript Object Notation and/or extensible markup language. These API calls are addressed to one or more uniform resource locators (URLs) that are API endpoints monitored by the transport services 126. In some examples, portions of the HTTP communications are encrypted to increase security. Alternatively or additionally, in some examples, the API is implemented as a .NET web API that responds to HTTP posts to particular URLs. Alternatively or additionally, in some examples, the API is implemented using simple file transfer protocol commands. Thus, the APIs as described herein are not limited to any particular implementation.

Continuing with the example of FIG. 1, the surveillance service 128 is configured to control overall logical setup and operation of the system 100. As such, the surveillance service 128 can interoperate with the transport services 126, the monitor interfaces 130, the customer interfaces 132, and any of the devices disposed at the location 102A via the network 118. In some examples, the surveillance service 128 is configured to monitor data from a variety of sources for reportable events (e.g., a break-in event) and, when a reportable event is detected, notify one or more of the monitor interfaces 130 and/or the customer interfaces 132 of the reportable event. In some examples, the surveillance service 128 is also configured to maintain state information regarding the location 102A. This state information can indicate, for instance, whether the location 102A is safe or under threat. In certain examples, the surveillance service 128 is configured to change the state information to indicate that the location 102A is safe only upon receipt of a communication indicating a clear event (e.g., rather than making such a change in response to discontinuation of reception of break-in events). This feature can prevent a "crash and smash" robbery from being successfully executed. In addition, in some examples, the surveillance service 128 is configured to setup and utilize bounding boxes for motion detection using layouts of different resolutions as described in further detail below.

Continuing with the example of FIG. 1, individual monitor interfaces 130 are configured to control computing device interaction with monitoring personnel and to execute a variety of programmatic operations in response to the interactions. For instance, in some examples, the monitor interface 130 controls its host device to provide information regarding reportable events detected at monitored locations, such as the location 102A, to monitoring personnel. Such events can include, for example, motion detection by one or more objects. Alternatively or additionally, in some examples, the monitor interface 130 controls its host device to interact with a user to configure features of the system 100, such as one or more monitor zones.

Continuing with the example of FIG. 1, individual customer interfaces 132 are configured to control computing device interaction with a customer and to execute a variety of programmatic operations in response to the interactions. For instance, in some examples, the customer interface 132 controls its host device to provide information regarding reportable events detected at monitored locations, such as the location 102A, to the customer. Such events can include, for example, detected motion by one or more objects. Alternatively or additionally, in some examples, the customer interface 132 is configured to process input received from the customer to activate or deactivate one or more of the devices disposed within the location 102A.

In some examples, multiple sensor functionalities can be integrated into a device. For example, motion sensing using temperature changes and image sensing can be integrated into a single device.

Figure 2:
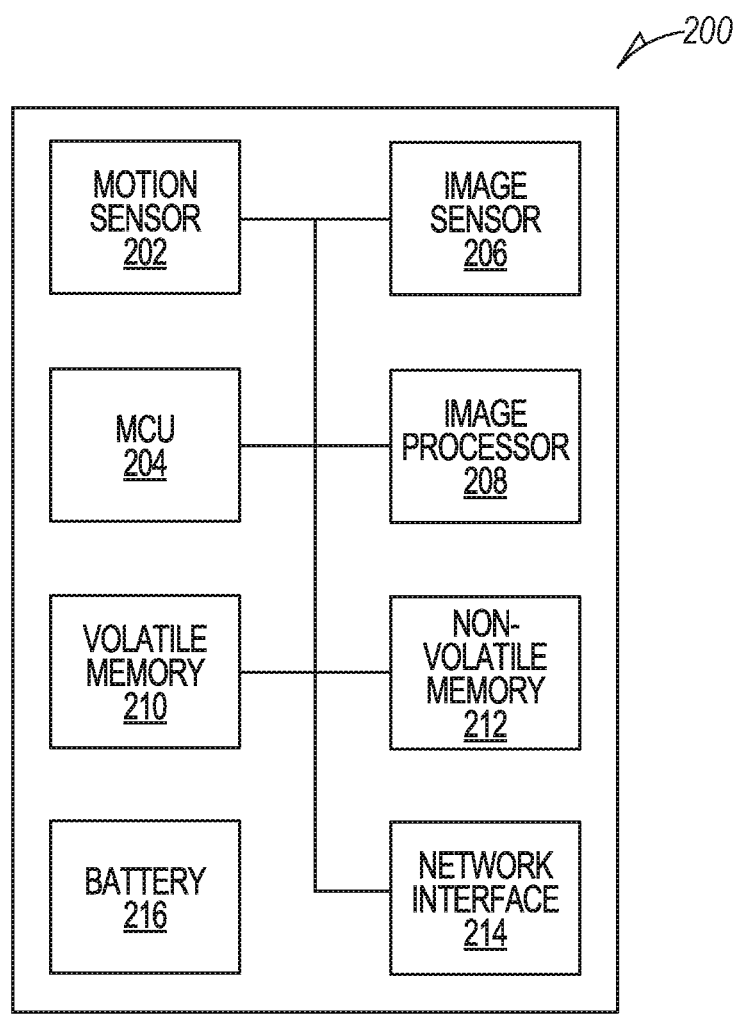
FIG. 2 is a schematic diagram of a camera device, according to some examples described herein.

FIG. 2 is a schematic diagram of portions of a camera 200 in accordance with some examples, which may be used as the image capture device 104 and/or 110. The camera 200 includes a motion sensor 202, a microcontroller (MCU) 204, an image sensor 206, an image processor 208, a volatile memory 210, a non-volatile memory 212, a network interface 214, and a battery 216. In certain examples illustrated by FIG. 2, the features of the camera device 200 enumerated above are incorporated within, or are a part of, a housing.

The motion sensor 202 may be provided as a temperature sensor. For example, motion sensor 202 may be provided as a passive infrared (PIR) sensor. The motion sensor 202 can measure infrared (IR) light in the FOV. The IR light represents the heat radiating from one or more objects (e.g., people, animals, etc.) in the FOV of the motion sensor 202. The motion sensor 202 generates Boolean sensor data specifying a still or alert state based on the measured IR light. Still state refers to no active motion being sensed by the motion sensor 202, and alert state refers to active motion being sensed by the motion sensor 202.

The MCU 204 is coupled to the motion sensor 202 and is configured to receive the data (e.g., Boolean sensor data) from the motion sensor 202. The MCU 204 can be provided as one or more processors. The MCU 204 may access the volatile memory 210 and non-volatile memory 210, and the MCU 204 can control operations of the camera device 200. When the data is indicative of an alert state (e.g., motion detected by motion sensor 202 based on temperature), the MCI 204 can transmit an instruction to capture an image to the image sensor 206, as described in further detail below.

The image sensor 206 can capture or otherwise record images of objects within a FOV of the image sensor 206. The image sensor 206 can generate frames of image data and transmit the frames to the image processor 208. The image processor 208 can include one or more processors. The image processor 208 may access the volatile memory 210 and non-volatile memory 210. The image processor 208 may detect motion in the image data using bounding boxes at different resolutions and classify the motion as being generated by one or more objects, as described in further detail below.

In some examples, the network interface 214 includes one or more physical interfaces (e.g., a radio, an ethernet port, a USB port, etc.) and a software stack including drivers and/or other code that is configured to communicate with the one or more physical interfaces to support one or more LAN, PAN, and/or WAN standard communication protocols. These communication protocols can include, for example, TCP and UDP, among others. As such, the network interface 214 enables the camera 204 to access and communicate with other computing devices (e.g., the other devices disposed in the location 102A of FIG. 1) via a computer network (e.g., the LAN established by the router 116).

The camera 200 may be configured to conserve power from the battery 216. In some examples, the image sensor 206 and/or image processor 208 is powered down or put in a low power state (e.g., sleep mode) when motion is not detected by the motion sensor 202 (e.g., still state). For example, when the MCU 204 receives data (e.g., Boolean sensor data) indicative of an event, the MCU 204 may generate and transmit an instruction for the image sensor 206 and/or image processor 208 to power up and initiate image capturing and image processing.

The image processor 208 may receive image data from the image sensor 206 and detect motion in the FOV, as described in further detail below. The image processor 208 can perform motion detection at multiple resolutions and aggregate the results. Performing motion detection at a single resolution can have limitations. The resolution (e.g., proportional to size of pixel blocks) can impact the accuracy of the motion detection results. Lower resolution, or smaller pixel blocks, can have difficulty detecting larger objects or objects closer to the camera. Higher resolution, on the other hand, can be more sensitive to noise, leading to less accurate results.

Figure 3:
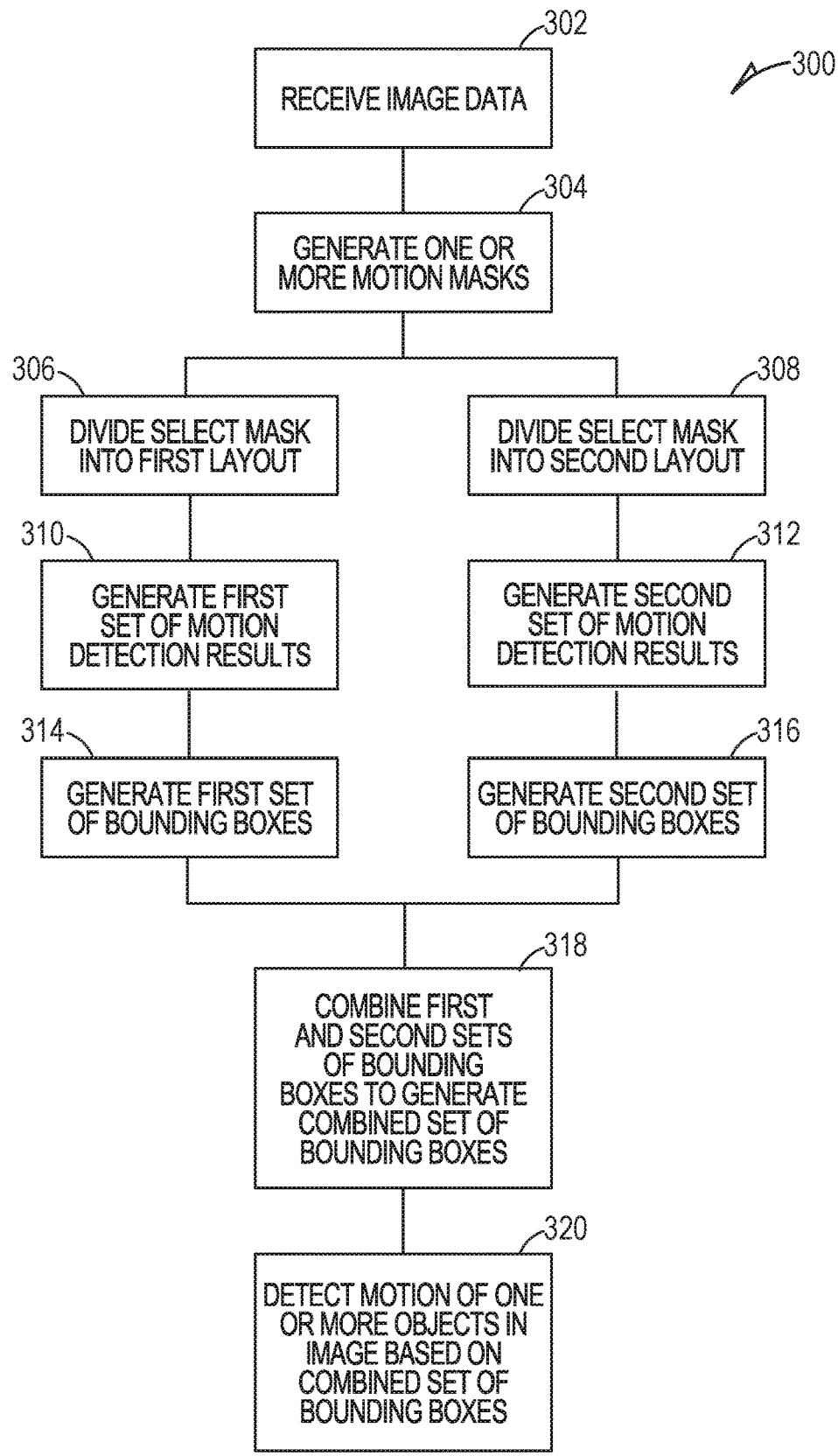
FIG. 3 is a flow diagram of a method for detecting motion, according to some examples described herein.

FIG. 3 is a flow diagram of a method 300 for detecting motion in accordance with some examples. In some examples, the method 300 may be executed in a camera (e.g., by image processor 208). In some examples, the method 300 may be executed at a different location than the camera (e.g., base station 114, surveillance service 128).

At operation 302, image data may be received. The image data may be received from an image sensor in the form of frames. The image may represent one or more objects in the FOV of the image sensor. The image data may be frames forming a color image (e.g., RGB image). For example, the image data may be a M×N pixel image. In some examples, the image data may be received in response to motion sensed by a motion sensor based on change of temperature, sound waves, etc.

At operation 304, a motion mask may be generated from the image data. A motion mask is a binary or grayscale representation where individual pixels represent motion or not. A motion mask may be created using background subtraction. For example, a RGB image may be converted to grayscale and the difference of two adjacent frames may be taken. The absolute value of the difference may represent the change in intensity of light from one frame to the next. Relative intensity change between frames may indicate motion in the binary or grayscale representation. As discussed in further detail below, more than one motion mask may be generated, at a different resolution. In some examples, the image may undergo preprocessing, for example gaussian filtering, for image refinement. Preprocessing can format the image to prepare the image for further processing. For example, the preprocessing can include resizing, orienting, color correction, etc.

At operation 306, the motion mask may be divided into a first layout. The first layout may be defined using a first set of blocks of pixels (e.g., grid of pixel blocks) of a first uniform or similar size. Pixel block refers to a group of pixels within a particular region or area of an image, typically rectangular or square in shape. For example, a M×N pixel image may be divided into a first layout using A×A pixel blocks, creating an (M/A)×(N/A) grid of blocks where individual pixel blocks are A×A in size.

At operation 308, the motion mask may be divided into a second layout. The second layout may be defined by using second set of pixel blocks of a second uniform size different than the first set. For example, a M×N pixel image may be divided into a second layout using B×B pixel blocks, creating (M/B)×(N/B) grid of blocks where individual pixel blocks are B×B in size. Resolution refers to the size of the pixel blocks in the respective layout. The first uniform size associated with the first layout may be greater than the second uniform size associated with the second layout. A is greater than B (A>B), so the first layout provides a lower resolution than the second layout.

In some examples, multiple motion masks may be generated at different resolutions. For example, a first motion mask may be generated from the image data at a first resolution to be used by the first layout, and a second motion mask may be generated from the image data at a second resolution to be used by the second layout. The first motion mask may be optimized for division into the first layout, and the second mask may be optimized for division into the second layout.

Figure 4:
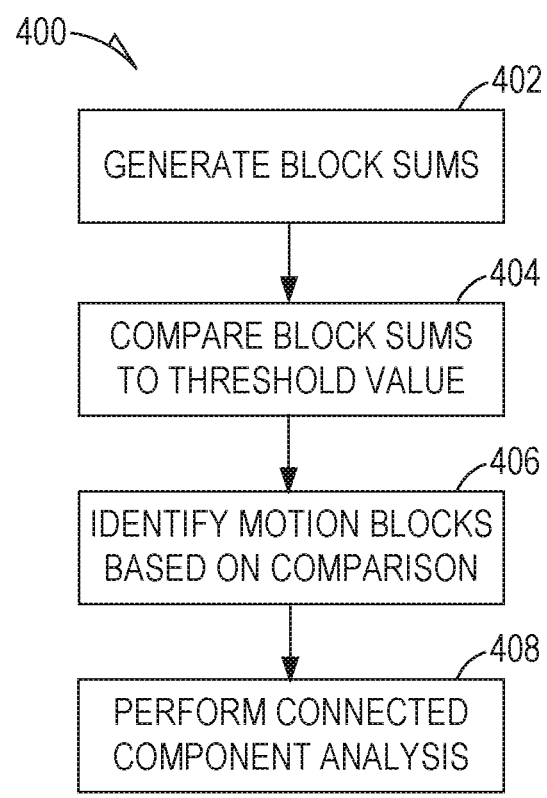
FIG. 4 is flow diagram of a method for generating motion detection results using layouts, according to some examples described herein.

At operation 310, a first set of motion detection results may be generated based on the first layout as described further below in relation to FIG. 4. The first set of motion detection results include a set of areas in the first layout indicative of motion. At operation 312, a second set of motion detection results may be generated based on the second layout. The second set of motion detection results include a set of areas in the second layout indicative of motion.

Motion detection results using the first and second layout can be generated using different techniques including threshold crossings. FIG. 4 is a flow diagram of a method 400 for generating motion detection results using layouts in accordance with some examples. Method 400 can be performed using the first and second layouts described with reference to FIG. 3.

At operation 402, the sum of blocks in the set of pixel blocks can be generated. That is, the pixel values in a given block may be summed to generate respective block sums. At operation 404, the sum of individual blocks may be compared to a threshold value. The threshold value may be a predetermined value representing a minimum value indicative of motion. The threshold value may be chosen based on a calibration phase. For example, several values of the threshold may be selected, and a motion detection routine may be executed on a set of videos using the different threshold values to determine which threshold value yields the most accurate motion detection results.

At operation 406, based on the comparison, blocks may be identified as indicative of motion (i.e., motion blocks). For example, blocks with values greater than the threshold may be identified as indicative of motion, and blocks with values less than (or equal to) the threshold may be identified as not being indicative of motion (i.e., non-motion blocks). At operation 408, a connected component analysis may be performed to combine adjacent motion blocks to generate the motion detection results. Connected component analysis may identify motion blocks adjacent to one another and may group them as one area or object indicative of motion. For example, human motion may be detected in five adjacent blocks, and the five adjacent blocks may be grouped as one human object.

Figure 5A:
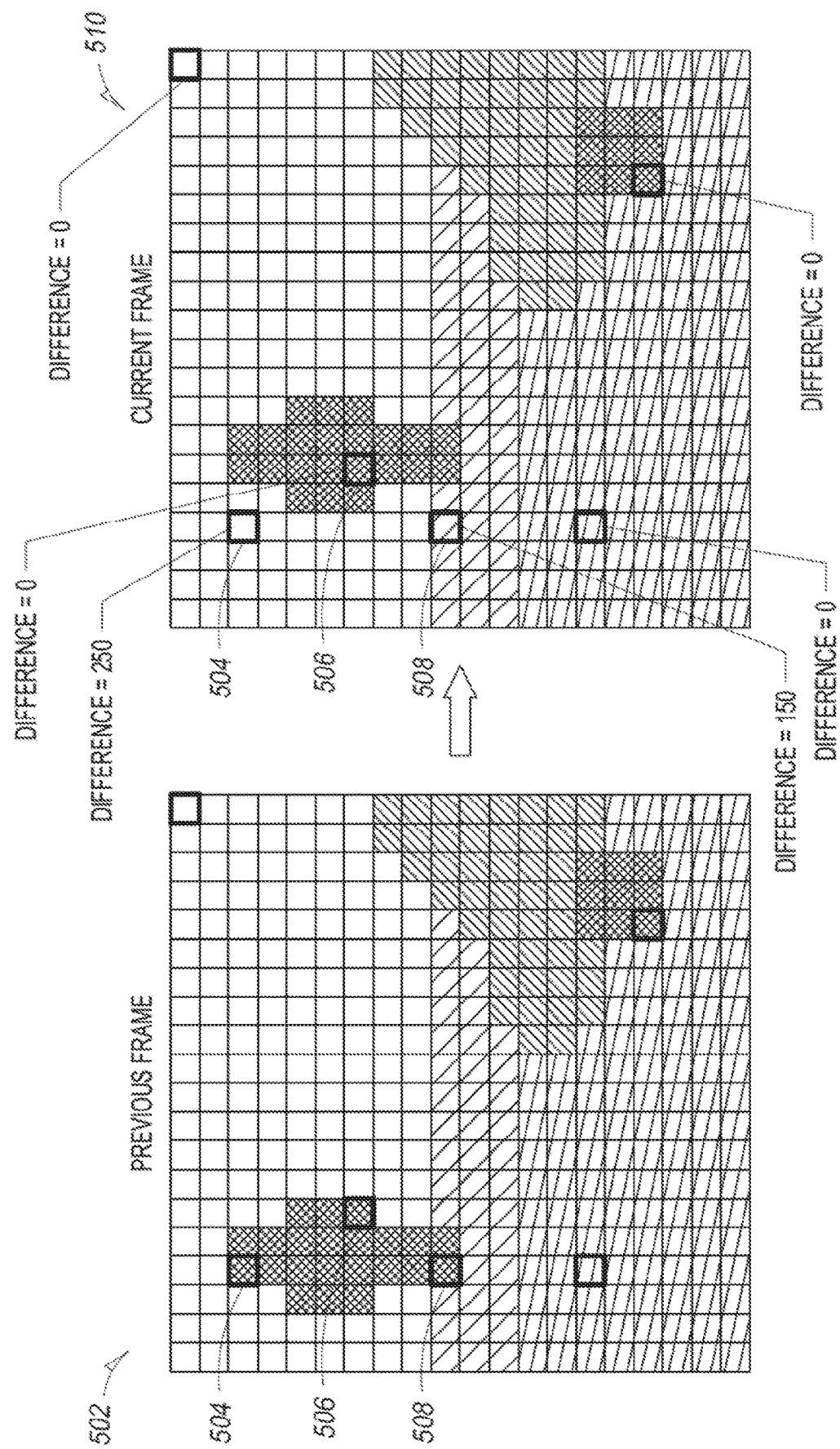
FIGS. 5A-5C illustrate a graphical representation of an example of motion detection, according to some examples described herein.
Figure 5B:
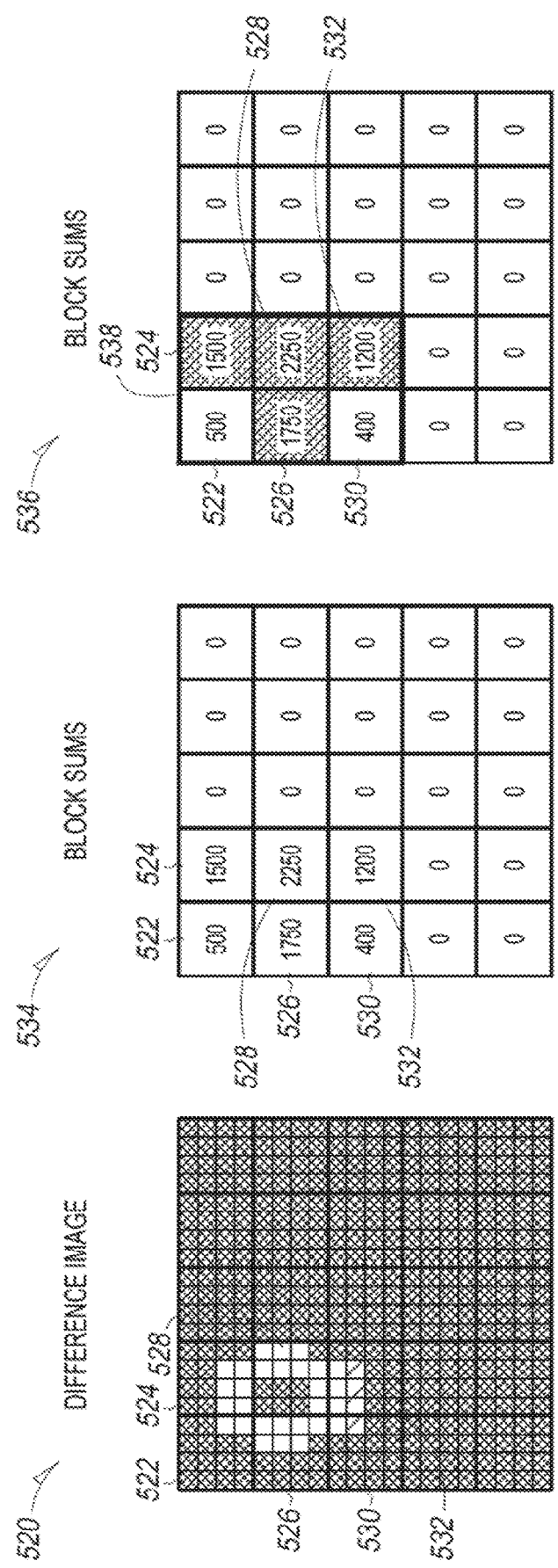
Figure 5C:
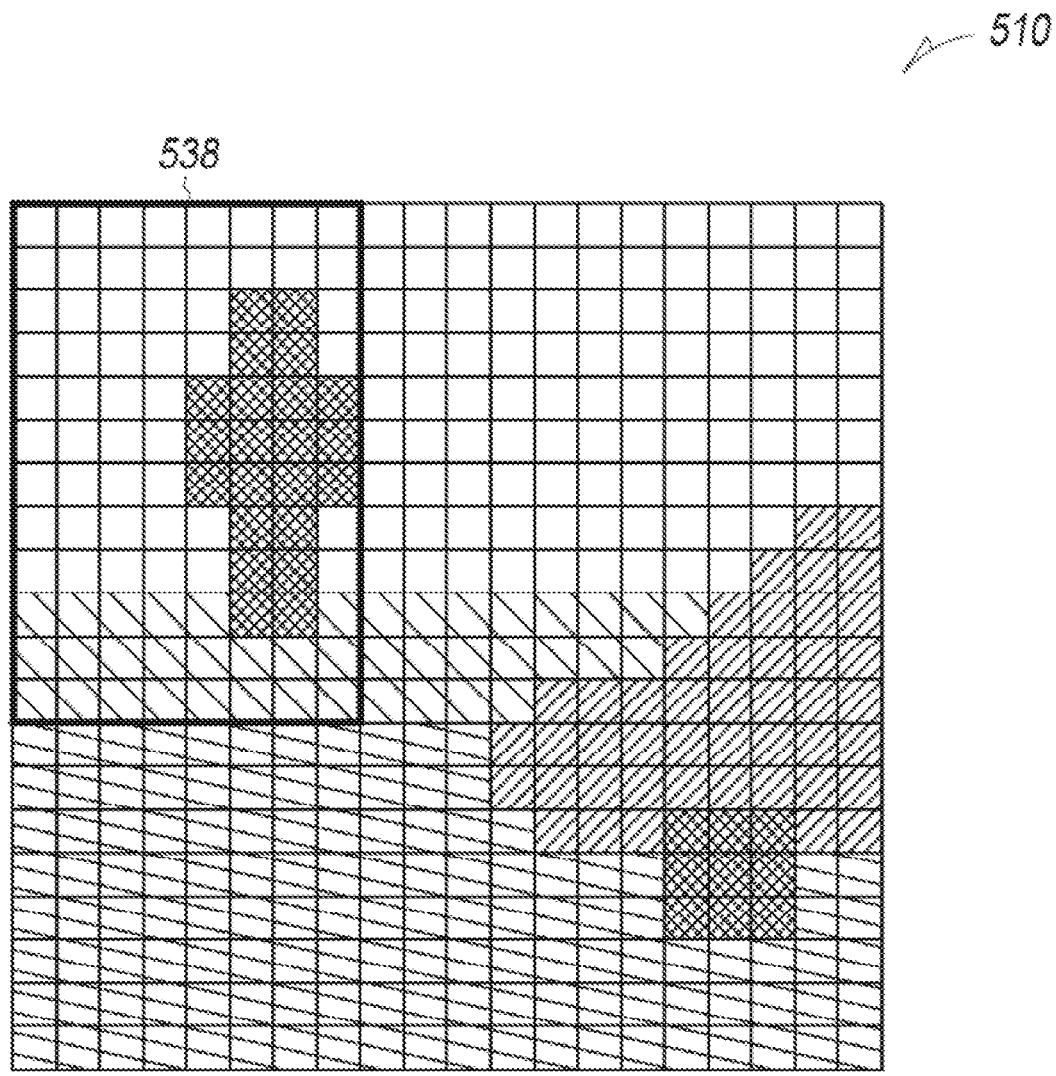

FIGS. 5A-5C illustrate a graphical representation of an example of motion detection, according to some examples described herein. FIG. 5A shows grayscale representations of a previous frame 502 and a current frame 510, which show movement by a person shifted to the right by two pixels. Pixels 504, 506, 508 in the previous frame 502 include different parts of the person. However, pixel 504 in the current frame 510 does not include the person, so the difference of the grayscale value is 250 in this example. Likewise, pixel 508 in the current frame 510 also does not include the person, so the difference of the grayscale value is 150 here because the road, which is darker than the sky in pixel 504, appears in pixel 508 in the current frame. Pixel 506 still includes the person, albeit a different part of the person, so the difference of the grayscale value is 0. The background (including a car and road) has not changed, so the difference values of the background pixels are 0.

FIG. 5B shows a difference image 520 in a grid using 4×4 pixel blocks. The difference image 520 includes pixel blocks 522-532, which include difference values for pixels corresponding to the person movement. Block sums grid 534 shows the block sum values of the pixel blocks. For example, pixel block 522 has a block sum value of 500, pixel block 524 has a block sum value of 1500, pixel block 526 has a block sum value of 1750, pixel block 528 has a block sum value of 2250, pixel block 530 has a block sum value 400, and pixel block 532 has a block sum value of 1200. The other pixel blocks have block sum values of 0 because there was no difference in their grayscale values. Consider, a threshold value is set at 600 for motion detection. Therefore, blocks 524, 526, 528, and 532 are marked as including motion detection, and the other blocks, such as pixel blocks 522 and 530, are marked as not including motion detection because their blocks sums are less than the threshold. As shown in block sums grid 536, a connected component analysis may be performed to determine regions of motion, and adjacent blocks 524, 526, 528, and 532 may be classified to be part of the same object. Bounding box 538 may be created around the motion object of pixel blocks 524, 526, 528, and 532. FIG. 5C shows the bounding box 538 overlay with the current frame 510.

Returning to method 300 of FIG. 3, at operation 314, a first set of bounding boxes may be generated based on the set of motion areas identified in the first layout. A bounding box is a rectangle or other suitable shape around a portion or an entirety of a detected object. At operation 316, a second set of bounding boxes may be generated based on the set of motion areas identified in the second layout. A set may include one or more bounding boxes.

At operation 318, the first set of bounding boxes and second set of bounding boxes may be combined to generate a combined set of bounding boxes. For example, the first set of bounding boxes and second bounding boxes may be aggregated using a set of rules. At operation 320, motion of the one or more objects represented in the image may be detected based on the combined set of bounding boxes. In some examples, more than two layouts may be used. Bounding boxes from the different layouts may be combined using a set of rules. The combined set of bounding boxes include motion detection results generated at different resolutions. Objects of different sizes and locations from the camera may be detected using the different resolutions. For example, certain sized or distance objects may be detected using a higher resolution, and other sized or distance objects may be detected using a lower resolution. The results from the different resolution may be aggregated to more accurately detect motion in the field of view.

Figure 6:
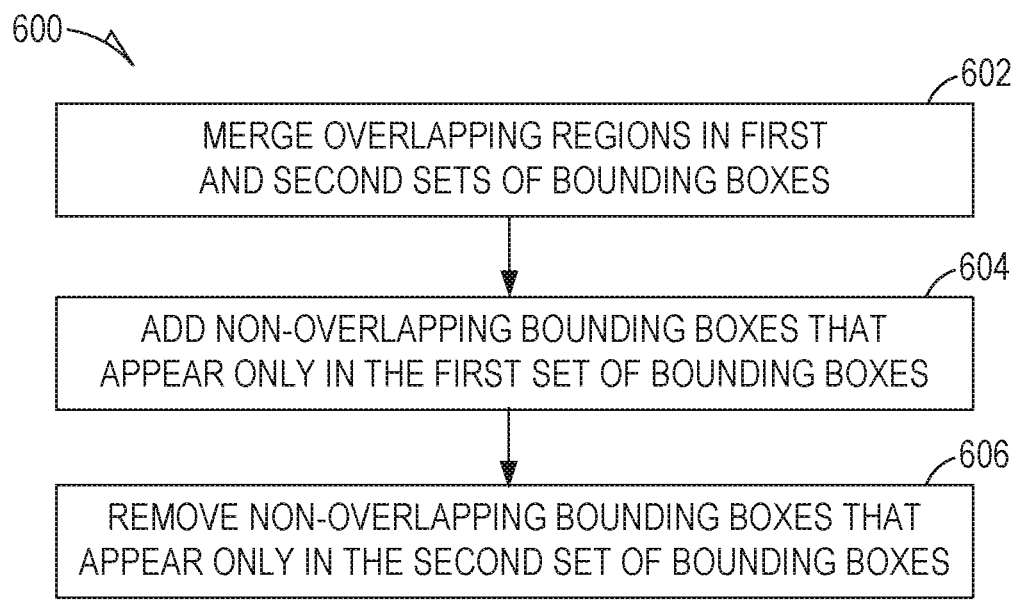
FIG. 6 is a flow diagram of a method for combining bounding boxes generated at different resolutions, according to some examples described herein.

The bounding boxes generated at different layout resolutions can be combined using different techniques. FIG. 6 is a flow diagram of a method 600 for combining bounding boxes generated at different resolutions using a set of rules in accordance with some examples. In this example, the first set of bounding boxes are generated using a A×A set of pixel blocks and the second set of bounding boxes are generated using a B×B set of pixel blocks, where A>B. That is, the resolution of the A×A set of pixel blocks is less than the resolution of B×B set of pixel blocks. As described below, the rules may define how to combine overlapping and non-overlapping bounding boxes in the respective layouts.

At operation 602, at least partially overlapping boxes the first and second set of boxes may be detected, and the overlapping boxes may be merged. For example, respective boundaries around the overlapping boxes may be generated to encompass the overlapping boxes in the first and second set of boxes. For example, the boundary may be the smallest rectangle that includes both the first and second overlapping boxes.

At operation 604, box(es) in the first set of bounding boxes (e.g., from A×A set of pixel blocks) not found to be overlapping with the second set of bounding boxes may be detected (i.e., non-overlapping) and those A×A only boxes may be added to the combined set of bounding boxes because motion detected only in the lower resolution is likely to correspond to actual motion.

At operation 606, box(es) in the second set of bounding boxes (e.g., from B×B set of pixel blocks) not found to be overlapping with the first set of bounding boxes may be detected (i.e., non-overlapping) and those B×B only boxes may not be included to the combined set of bounding boxes. These B×B only boxes may be discarded because they may represent noise detected at the higher resolution. Higher resolution layouts can detect finer motion, but are also more sensitive to noise, which can refer to artifacts that do not originate from the image.

Figure 7:
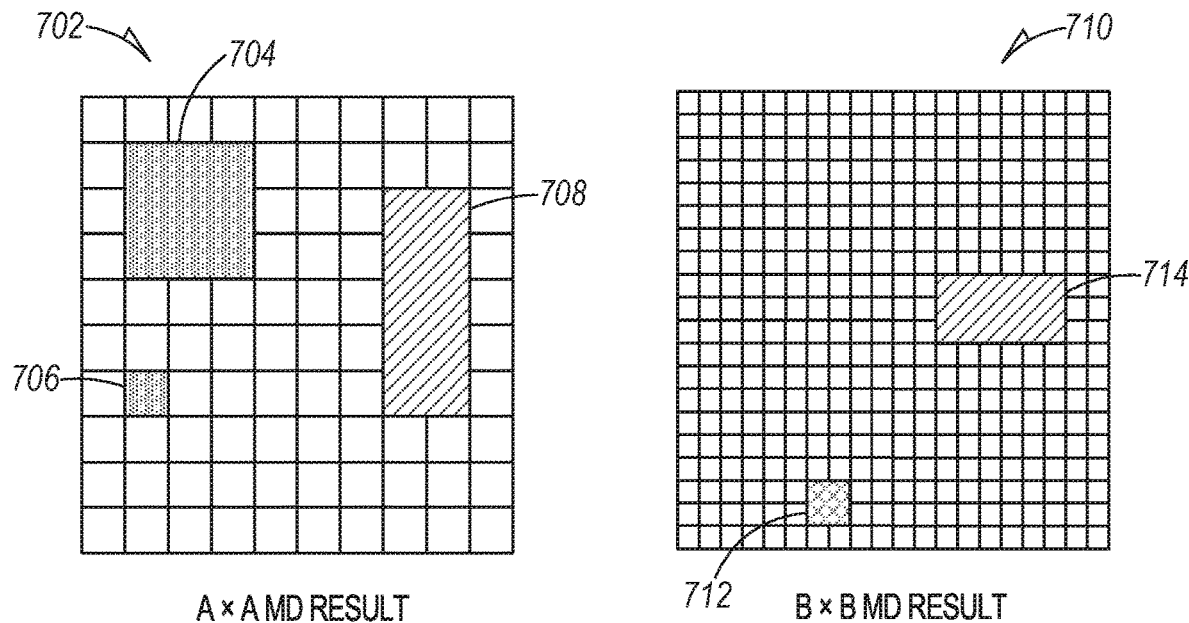
FIG. 7 is a graphical representation of an example combining bounding boxes generated at different resolutions.
Figure 7:
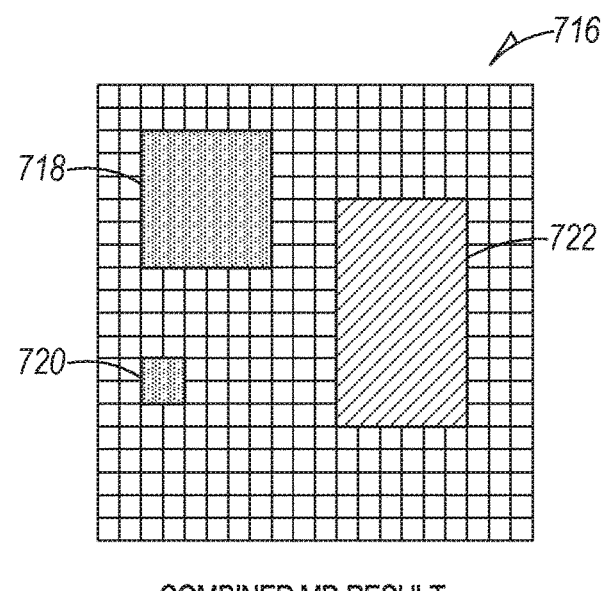

FIG. 7 is a graphical representation of an example of combining bounding boxes generated using different layouts that define different resolutions of pixels using the set of rules defined in the discussion above with respect to FIG. 6. Motion detection results using a first grid of pixel blocks 702 with pixel blocks the size A×A is shown with three bounding boxes 704, 706, 708. Motion detection results using a second grid of pixel blocks 710 with pixel blocks the size B×B is shown with two bounding boxes 712, 714. In this example, A>B. The combined motion detection results 716 are shown with three combined bounding boxes 718, 720, 722.

Bounding box 708 in the first grid 702 overlaps with bounding box 714 in the second grid 710; therefore, bounding boxes 708 and 714 are merged to form bounding box 722 (e.g., operation 602). Bounding box 722 is sufficient size to encompass a region of the grayscale representation of the received image defined by both bounding boxes 708 and 714.

Bounding boxes 704 and 706 in the first grid 702 do not overlap with any bounding box in the second grid 710; therefore, they are included in the combined motion detection results 716 represented by bounding boxes 718 and 720 (e.g., operation 604). Bounding box 712 in the second grid 710 does not overlap with any bounding box in the first grid 702; therefore, bounding box 712 is not included in the combined results (e.g., operation 606). Because the second grid 710 is at a higher resolution, bounding boxes found only in the second grid, such as bounding box 712, may be representative of noise rather than actual motion. Such boundary boxes are therefore excluded from the final motion detection results to avoid a false positive identification of an object.

The techniques to detect motion detection using sets of pixel blocks (e.g., grids of pixel blocks) described herein can provide more accurate results. The techniques can be used to differentiate noise from actual motion, detect different sized objects and objects at different distances from the camera, and identify motions from a single object more accurately. For example, noise can be detected based on bounding boxes found only in the higher resolution layout because the higher resolution layout can be more sensitive to noise. As another example, motion caused by a single object may be detected as motion by multiple objects in one resolution and detected as motion by a single object in the other resolution depending on the size or location of the object, but the combined results may correctly classify the motion as being caused by the single object based on the overlap of bounding boxes in the different resolutions. By using bounding boxes at different resolutions, motion may be more accurately detected as compared to using bounding boxes at a pre-set single resolution.

Next, some examples are described of motion detection using aggregated bounding boxes at different resolutions. In these examples, a first grid is generated using 16×16 size pixel blocks, and a second grid is generated using 8×8 size pixel blocks; hence, the resolution of the first grid is lower than resolution of the second grid.

Figure 8:
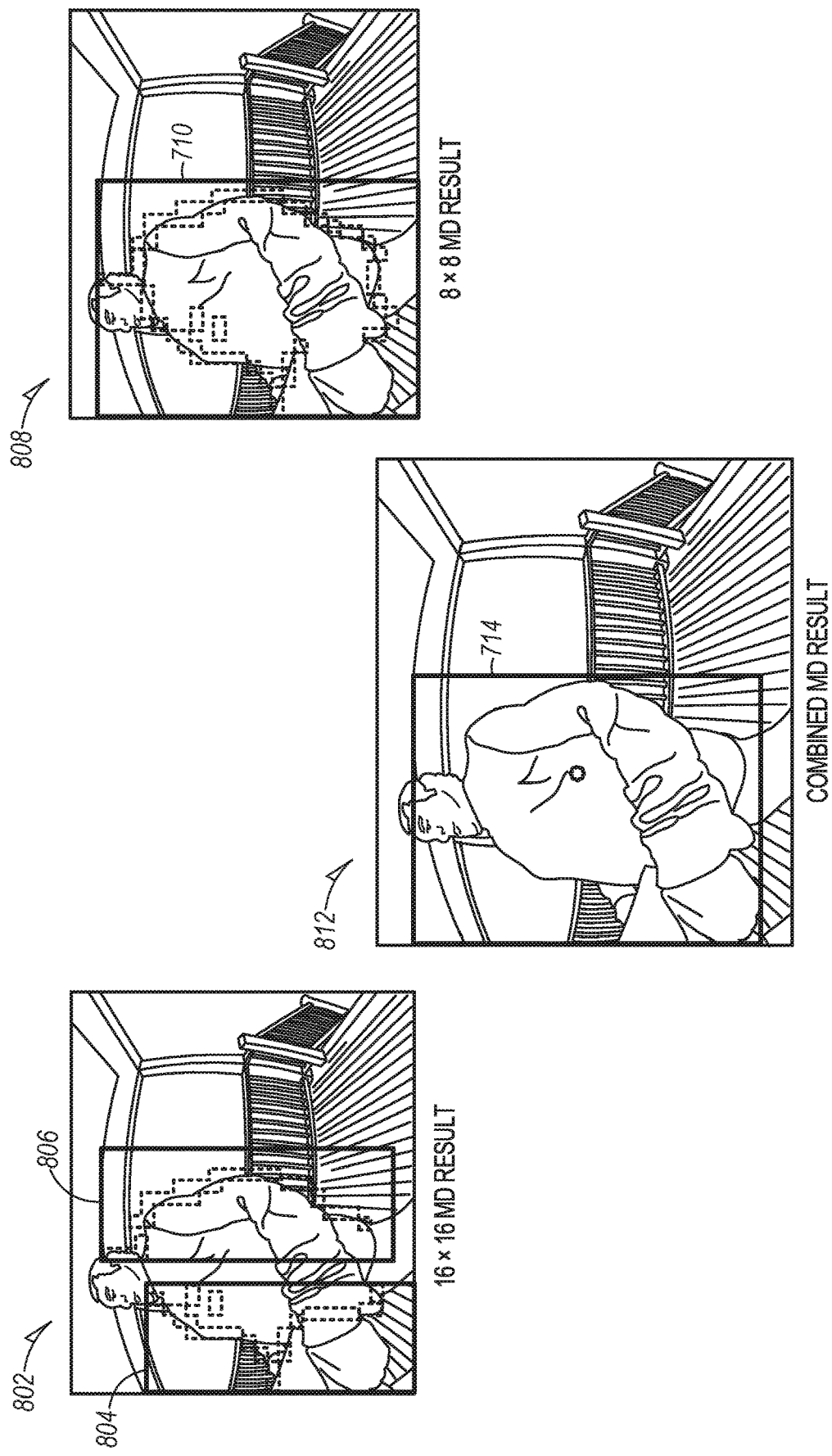
FIG. 8 illustrates an example of connecting disjointed bounding boxes in a lower resolution layout using bounding box information from a higher resolution layout.

FIG. 8 illustrates an example of connecting disjointed bounding boxes in a lower resolution layout using bounding box information from a higher resolution layout. The first grid 802 (lower resolution layout) shows pixel blocks of detected motion related to a single human object close to the camera with bounding boxes 804 and 806. The size of bounding boxes 804 and 806 is determined using connected component analysis of adjacent motion blocks; however, bounding boxes 804 and 806 were not connected based on the connected component analysis because motion-detected regions in boxes 804 and 806 are not adjacent to one another. The second grid 808 (higher resolution layout) shows pixels blocks of detected motion related to the single human object with a single bounding box 810. The combined results 812 merges the two separate bounding boxes 804, 806 from the first grid 802 and the bounding box 810 from the second grid 808 because they are overlapping, resulting in a single bounding box 814 encompassing the motion detected from various parts of the single human object.

Figure 9:
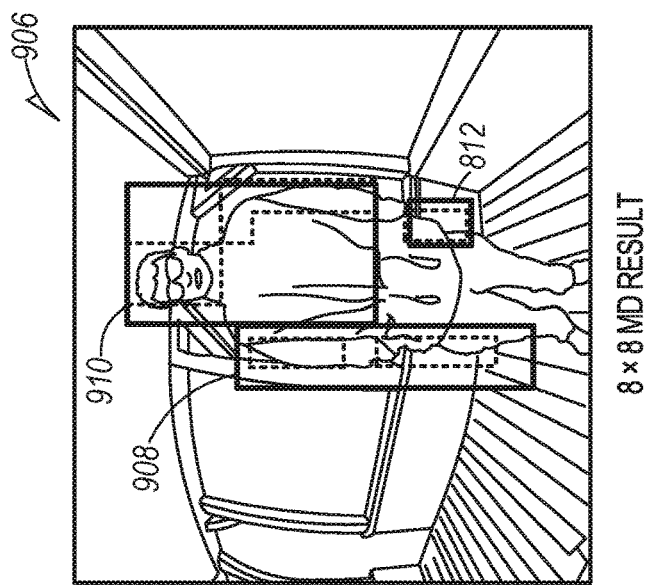
FIG. 9 illustrates an example of connected disjointed bounding boxes in a higher resolution layout using boundary box information from a lower resolution layout.
Figure 9:
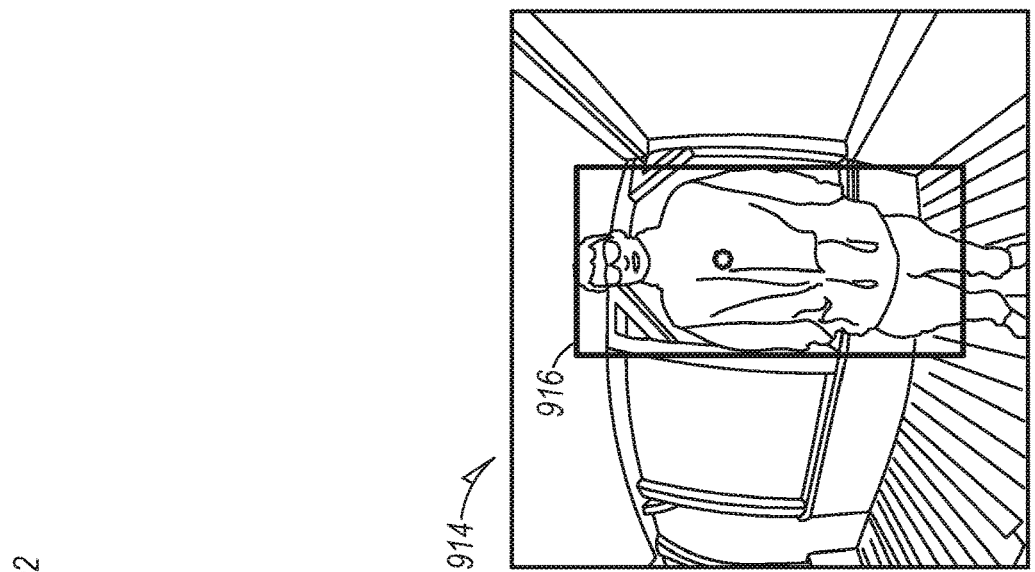
Figure 9:
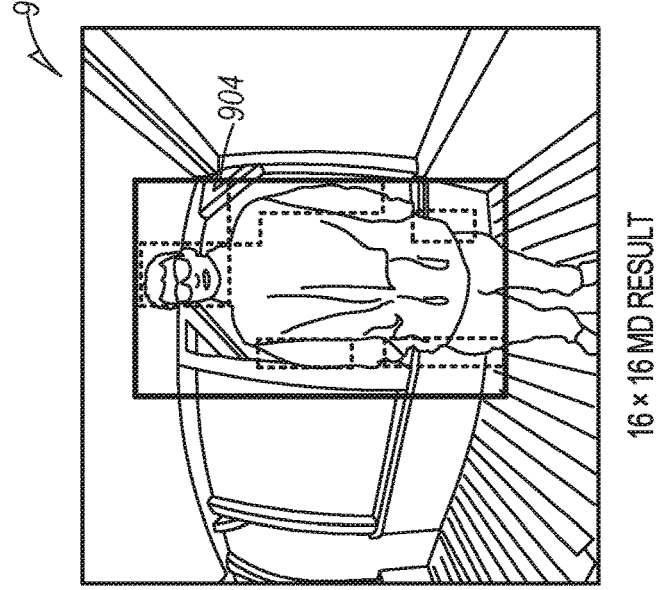

FIG. 9 illustrates an example of connected disjointed bounding boxes in a higher resolution layout using bounding box information from a lower resolution layout. The first grid 902 (lower resolution layout) shows pixel blocks of detected motion related to a single human object further away from the camera with bounding box 904. The second grid 906 (higher resolution layout) shows motion from the same human object as three separate bounding boxes 908, 910, 912. The size of bounding boxes 908, 910, 912 is determined using connected component analysis; however, bounding boxes 908, 910, 912 were not connected based on the connected component analysis. The combined results 914 merges the three separate bounding boxes 908, 910, 912 in the second grid 906 and the bounding box 904 from the first grid 902, resulting in a single bounding box 916 encompassing the motion detected from various parts of the single human object.

Figure 10:
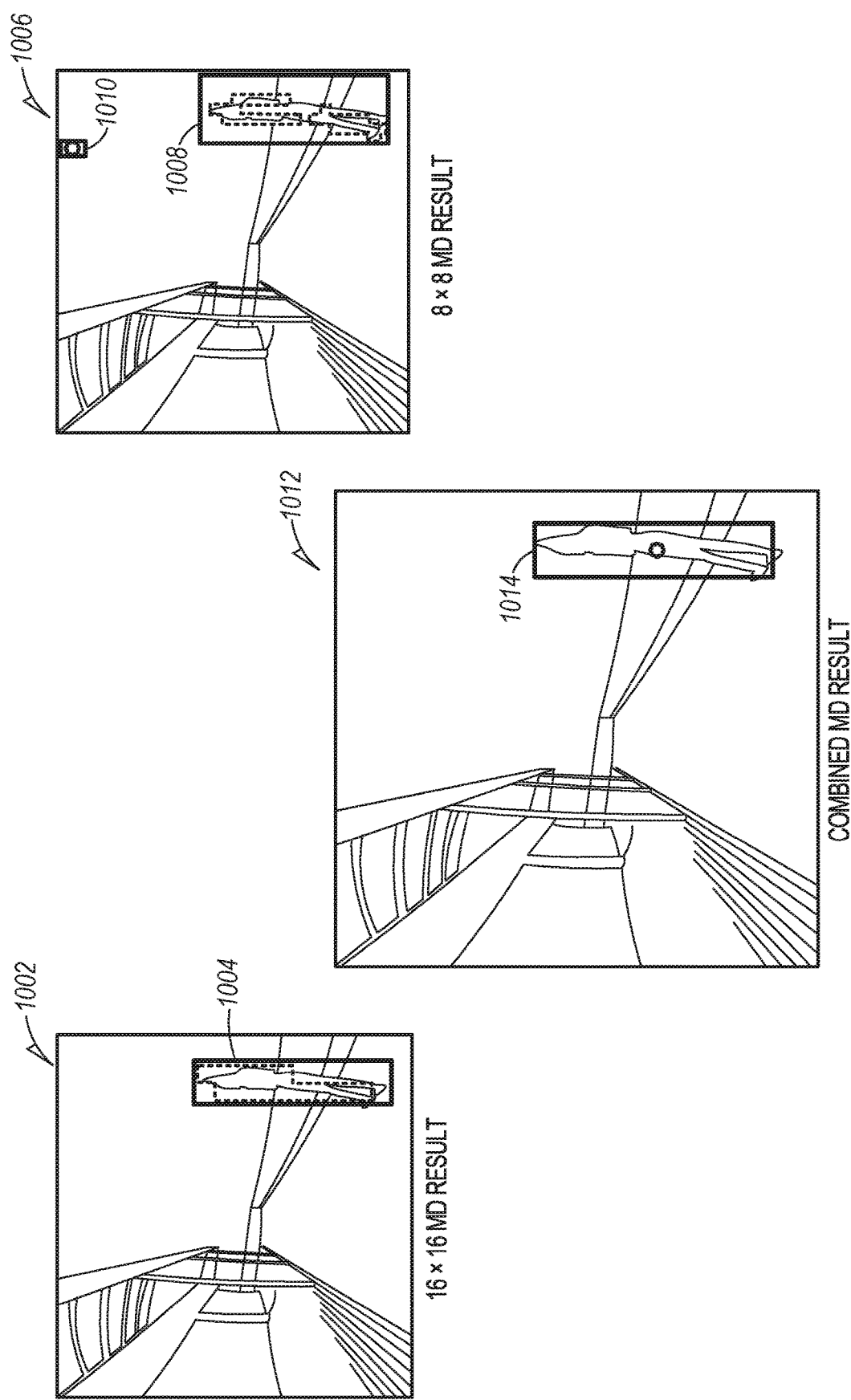
FIG. 10 illustrates an example of ignoring noise detected in a higher resolution layout using information from a lower resolution layout.

FIG. 10 illustrates an example of ignoring noise detected in a layout of higher resolution using information from a layout of lower resolution. The first grid 1002 (lower resolution layout) shows pixel blocks of detected motion related to a single human object with bounding box 1004. The second grid 1006 (higher resolution layout) shows motion from the same human object with bounding box 1008, and the second grid 1006 also shows possible detected motion above the human object with bounding box 1010. Because the bounding box 1010 does not overlap with any bounding box in the first grid 1002, the combined results 1012 discards bounding box 1010 as possible noise and only shows a single bounding box 1014 merging or otherwise combining the overlapping bounding boxes 1004 and 1008.

Figure 11:
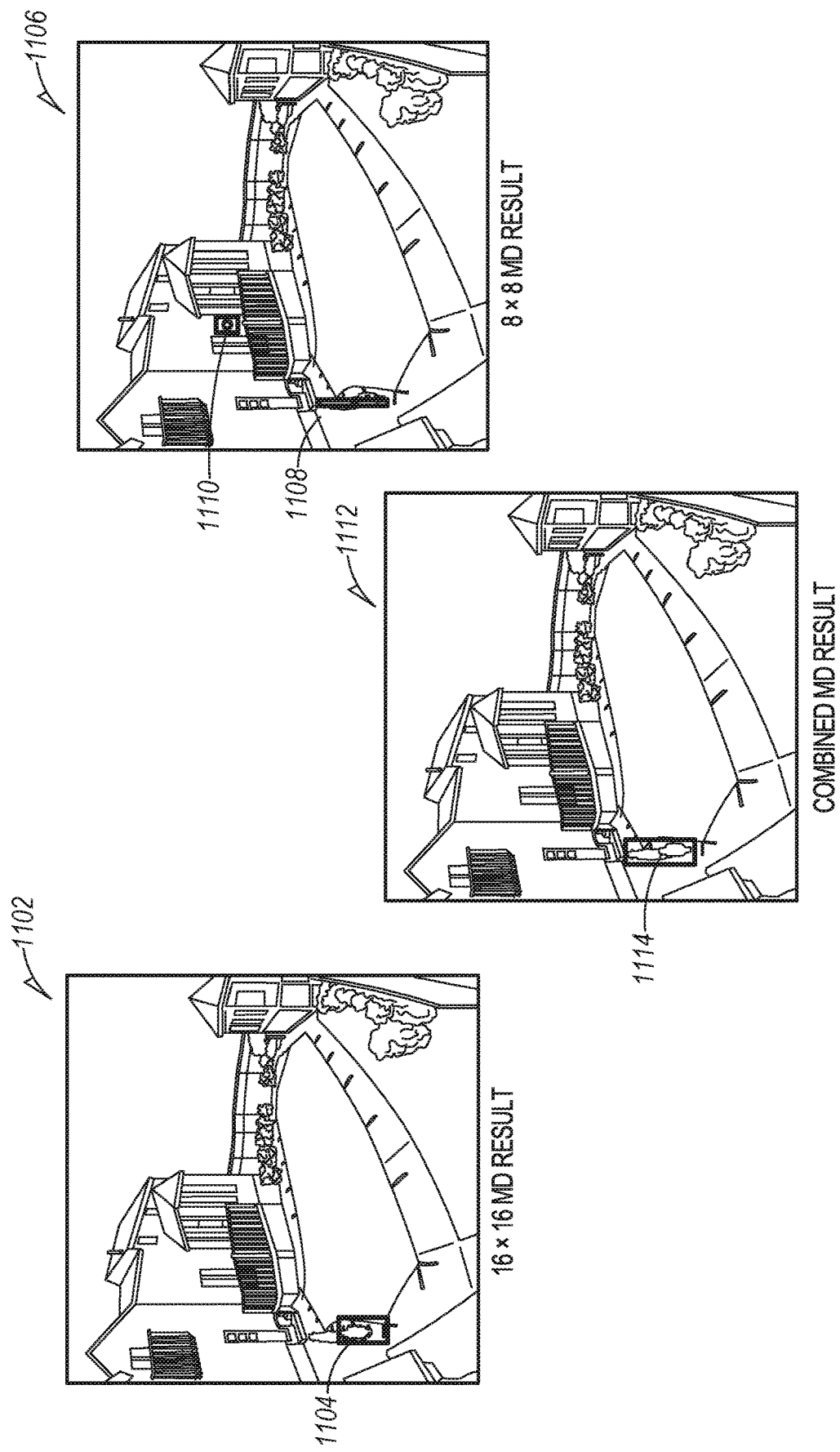
FIG. 11 illustrates an example of ignoring noise and improving motion detection accuracy by aggregating bounding box information from different resolutions.

FIG. 11 illustrates an example of ignoring noise and improving motion detection accuracy by aggregating bounding boxes from layouts with different resolutions. The first grid 1102 (lower resolution layout) shows pixel blocks of detected motion related to a single human object with bounding box 1104, but bounding box 1104 covers a part of the human object (e.g., legs) and not the entire human object. The second grid 1106 (higher resolution layout) shows pixel blocks of detected motion of the same human object with bounding box 1108, but bounding box 1108 covers a part of the human object (e.g., narrow part of body) and not the entire human object. The second grid 1106 also shows possible detected motion up above with bounding box 1110. The combined results 1112 merges overlapping bounding boxes 1104 and 1108 to create bounding box 1114 that better encompasses the entire human object. Also, the combined results 1112 discards bounding box 1110 as possible noise as it was only detected in the higher resolution layout.

Figure 12:
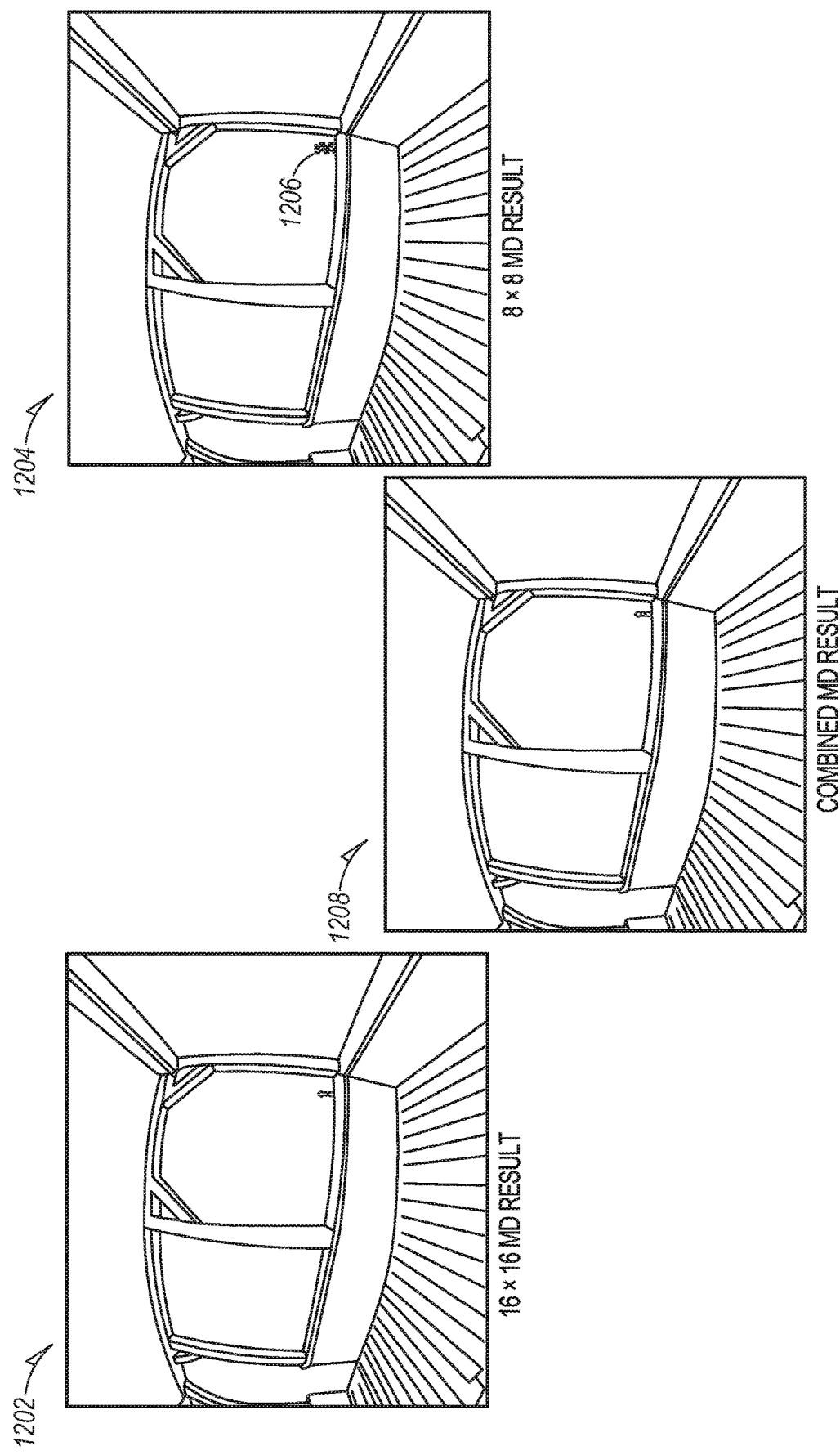
FIG. 12 illustrates an example of handling motion from objects far away from the camera.

FIG. 12 illustrates an example of handling motion from objects far away from the camera. The first grid 1202 (lower resolution layout) shows no motion. The second grid 1204 (higher resolution layout) shows a small bounding box 1206 of possible motion detected from a faraway object, that may not be relevant for security monitoring purposes. The combined results 1208 discards the bounding box 1206 because there is no overlapping bounding box in the first grid 1202 and shows no detected motion. Thus, results 1208 prevent a false-positive motion detection result caused by a faraway object.

Figure 13:
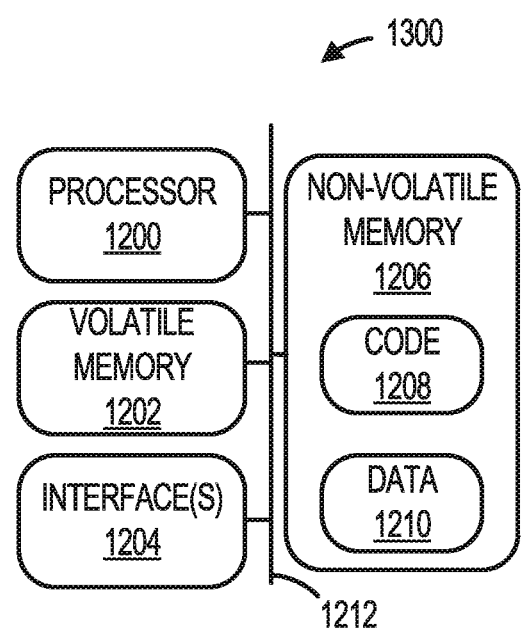
FIG. 13 is a schematic diagram of a computing device, according to some examples described herein.

Turning now to FIG. 13, a computing device 1300 is illustrated schematically. In some examples, the methods and processes described may be executed by devices such as the computing device 1300. As shown in FIG. 13, the computing device includes at least one processor 1301, volatile memory 1302, one or more interfaces 1304, non-volatile memory 1306, and an interconnection mechanism 1312. The non-volatile memory 1306 includes code 1308 and at least one data store 1310.

In some examples, the non-volatile (non-transitory) memory 1306 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 1308 stored in the non-volatile memory can include an operating system and one or more applications or programs that are configured to execute under the operating system. Alternatively or additionally, the code 1308 can include specialized firmware and embedded software that is executable without dependence upon a commercially available operating system. Regardless, execution of the code 1308 can result in manipulated data that may be stored in the data store 1310 as one or more data structures. The data structures may have fields that are associated through location in the data structure. Such associations may likewise be achieved by allocating storage for the fields in locations within memory that convey an association between the fields. However, other mechanisms may be used to establish associations between information in fields of a data structure, including through the use of pointers, tags, or other mechanisms.

Continuing the example of FIG. 13, the processor 1301 can be one or more programmable processors to execute one or more executable instructions, such as a computer program specified by the code 1308, to control the operations of the computing device 1300. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 1302) and executed by the circuitry. In some examples, the processor 1300 is a digital processor, but the processor 1300 can be analog, digital, or mixed. As such, the processor 1300 can execute the function, operation, or sequence of operations using digital values and/or using analog signals. In some examples, the processor 1300 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 1300 that are multicore can provide functionality for parallel, simultaneous execution of instructions or for parallel, simultaneous execution of one instruction on more than one piece of data.

Continuing with the example of FIG. 13, prior to execution of the code 1308 the processor 1300 can copy the code 1308 from the non-volatile memory 1306 to the volatile memory 1302. In some examples, the volatile memory 1302 includes one or more static or dynamic random access memory (RAM) chips and/or cache memory (e.g. memory disposed on a silicon die of the processor 1300). Volatile memory 1302 can offer a faster response time than a main memory, such as the non-volatile memory 1306.

Through execution of the code 1308, the processor 1300 can control operation of the interfaces 1304. The interfaces 1304 can include network interfaces. These network interfaces can include one or more physical interfaces (e.g., a radio, an ethernet port, a USB port, etc.) and a software stack including drivers and/or other code 1308 that is configured to communicate with the one or more physical interfaces to support one or more LAN, PAN, and/or WAN standard communication protocols. The communication protocols can include, for example, TCP and UDP among others. As such, the network interfaces enable the computing device 1300 to access and communicate with other computing devices via a computer network.

The interfaces 1304 can include user interfaces. For instance, in some examples, the user interfaces include user input and/or output devices (e.g., a keyboard, a mouse, a touchscreen, a display, a speaker, a camera, an accelerometer, a biometric scanner, an environmental sensor, etc.) and a software stack including drivers and/or other code 1308 that is configured to communicate with the user input and/or output devices. As such, the user interfaces enable the computing device 1300 to interact with users to receive input and/or render output. This rendered output can include, for instance, one or more GUIs including one or more controls configured to display output and/or receive input. The input can specify values to be stored in the data store 1310. The output can indicate values stored in the data store 1310.

Continuing with the example of FIG. 13, the various features of the computing device 1300 described above can communicate with one another via the interconnection mechanism 1312. In some examples, the interconnection mechanism 1312 includes a communications bus.

Various inventive concepts may be embodied as one or more methods, of which examples have been provided. The acts performed as part of a method may be ordered in any suitable way. Accordingly, examples may be constructed in which acts are performed in an order different than illustrated, which may include performing some acts simultaneously, even though shown as sequential acts in illustrative examples.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Having described several examples in detail, various modifications and improvements will readily occur to those skilled in the art. Such modifications and improvements are intended to be within the scope of this disclosure. Accordingly, the foregoing description is by way of example only, and is not intended as limiting.

Described implementations of the subject matter can include one or more features, alone or in combination as illustrated below by way of example.

Example 1. A method comprising: dividing an image into a first layout and a second layout, the image representing one or more objects, the first layout including a first set of blocks of pixels of a first uniform size, the second layout including a second set of blocks of pixels of a second uniform size, and the first uniform size being greater than the second uniform size; generating a first set of bounding boxes based on a first set of areas in the first layout indicative of motion; generating a second set of bounding boxes based on a second set of areas in the second layout indicative of motion; combining the first set of bounding boxes and the second set of bounding boxes to generate a combined set of bounding boxes; and detecting motion of the one or more objects represented in the image based on the combined set of bounding boxes Example 2. The method of example 1, wherein combining the first set of bounding boxes and the second set of bounding boxes includes: detecting a first region in the first set of bounding boxes that at least partially overlaps a second region in the second set of bounding boxes; and generating a boundary around the first and second regions, the boundary being a sufficient size to encompass the first and second regions.

Example 3. The method of any of examples 1-2, wherein combining the first set of bounding boxes and the second set of bounding boxes includes: detecting a first region in the first set of bounding boxes not found in the second set of bounding boxes; and adding the first region in the first set of bounding boxes in the combined set of bounding boxes.

Example 4. The method of any of examples 1-3, wherein combining the first set of bounding boxes and the second set of bounding boxes includes: detecting a first region in the second set of bounding boxes not found in the first set of bounding boxes; and not including the first region in the second set of bounding boxes in the combined set of bounding boxes.

Example 5. The method of any of examples 1-4, further comprising: generating at least one grayscale representation of the image, wherein the first and second layouts are defined from the at least one grayscale representation.

Example 6. The method of any of examples 1-5, wherein the at least one grayscale representation includes two grayscale representations at different resolutions.

Example 7. The method of any of examples 1-6, further comprising: receiving the image in response to motion detected by an infrared sensor.

Example 8. A method comprising: dividing an image into a first layout defined by a first resolution and a second layout defined by a second resolution; generating a plurality of first resolution bounding boxes indicative of motion using the first layout; generating a second resolution bounding box indicative of motion using the second layout; determining that the plurality of first resolution bounding boxes overlap with the second resolution bounding box; merging the plurality of first resolution bounding boxes and the second resolution bounding box to generate a single box encompassing areas defined by the plurality of first resolution bounding boxes and the second resolution bounding box; and detecting motion of a single object based on the single box.

Example 9. The method of example 8, wherein the plurality of first resolution bounding boxes are generated by: comparing block sum values of respective pixel blocks in the first layout to a threshold value; identifying motion blocks based on the comparing; and performing connected component analysis to join adjacent motion blocks to define sizes of respective first resolution bounding boxes.

Example 10. The method of any of examples 8-9, wherein the first resolution is less than the second resolution, the method further comprising: identifying a non-overlapping bounding box in the first layout not overlapping with bounding boxes in the second layout; and including the non-overlapping bounding box in final motion detection results.

Example 11. The method of any of examples 8-10, wherein the first resolution is less the second resolution, the method further comprising: identifying a non-overlapping bounding box in the second layout not overlapping with bounding boxes in the first layout; and discarding the non-overlapping bounding box from final motion detection results.

Example 12. The method of any of examples 8-11, further comprising: generating at least one grayscale representation of the image, wherein the first and second layouts are defined from the at least one grayscale representation.

Example 13. The method of any of examples 8-12, further comprising: receiving the image in response to motion detected by an infrared sensor.

Example 14. A system comprising: an image sensor to generate an image; and a processor coupled to the image sensor, the processor configured to perform operations implementing any one of example methods 1 to 13.

Example 15. A machine-readable storage device embodying instructions that, when executed by a machine, cause the machine to perform operations implementing any one of example methods 1 to 13.

The invention claimed is:

1. A method comprising:
  dividing an image into a first layout and a second layout, the image representing one or more objects, the first layout including a first set of blocks of pixels of a first uniform size, the second layout including a second set of blocks of pixels of a second uniform size, and the first uniform size being greater than the second uniform size;
  generating a first set of bounding boxes based on a first set of areas in the first layout indicative of motion;
  generating a second set of bounding boxes based on a second set of areas in the second layout indicative of motion;
  combining the first set of bounding boxes and the second set of bounding boxes to generate a combined set of bounding boxes; and
  detecting motion of the one or more objects represented in the image based on the combined set of bounding boxes.

2. The method of claim 1, wherein combining the first set of bounding boxes and the second set of bounding boxes includes:
  detecting a first region in the first set of bounding boxes that at least partially overlaps a second region in the second set of bounding boxes; and
  generating a boundary around the first and second regions, the boundary being a sufficient size to encompass the first and second regions.

3. The method of claim 1, wherein combining the first set of bounding boxes and the second set of bounding boxes includes:
  detecting a first region in the first set of bounding boxes not found in the second set of bounding boxes; and
  adding the first region in the first set of bounding boxes in the combined set of bounding boxes.

4. The method of claim 1, wherein combining the first set of bounding boxes and the second set of bounding boxes includes:
  detecting a first region in the second set of bounding boxes not found in the first set of bounding boxes; and
  not including the first region in the second set of bounding boxes in the combined set of bounding boxes.

5. The method of claim 1, further comprising:
  generating at least one grayscale representation of the image, wherein the first and second layouts are defined from the at least one grayscale representation.

6. The method of claim 5, wherein the at least one grayscale representation includes two grayscale representations at different resolutions.

7. The method of claim 1, further comprising:
  receiving the image in response to motion detected by an infrared sensor.

8. A system comprising:
  an image sensor to generate an image; and
  a processor coupled to the image sensor, the processor configured to:
  dividing the image into a first layout and a second layout, the image representing one or more objects, the first layout including a first set of blocks of pixels of a first uniform size, the second layout including a second set of blocks of pixels of a second uniform size, and the first uniform size being greater than the second uniform size;
  generating a first set of bounding boxes based on a first set of areas in the first layout indicative of motion;
  generating a second set of bounding boxes based on a second set of areas in the second layout indicative of motion;
  combining the first set of bounding boxes and the second set of bounding boxes to generate a combined set of bounding boxes; and
  detecting motion of the one or more objects represented in the image based on the combined set of bounding boxes.

9. The system of claim 8, wherein combining the first set of bounding boxes and the second set of bounding boxes includes:
  detecting a first region in the first set of bounding boxes that at least partially overlaps a second region in the second set of bounding boxes; and
  generating a boundary around the first and second regions, the boundary being a sufficient size to encompass the first and second regions.

10. The system of claim 8, wherein combining the first set of bounding boxes and the second set of bounding boxes includes:

detecting a first region in the first set of bounding boxes not found in the second set of bounding boxes; and adding the first region in the first set of bounding boxes in the combined set of bounding boxes.

11. The system of claim 8, wherein combining the first set of bounding boxes and the second set of bounding boxes includes:

detecting a first region in the second set of bounding boxes not found in the first set of bounding boxes; and not including the first region in the second set of bounding boxes in the combined set of bounding boxes.

12. The system of claim 8, wherein the processor is further configured to:

generating at least one grayscale representation of the image, wherein the first and second layouts are defined from the at least one grayscale representation.

13. The system of claim 12, wherein the at least one grayscale representation includes two grayscale representations at different resolutions.

14. The system of claim 8, further comprising:

an infrared sensor to sense motion.

15. A method comprising:

dividing an image into a first layout defined by a first resolution and a second layout defined by a second resolution;

generating a plurality of first resolution bounding boxes indicative of motion using the first layout;

generating a second resolution bounding box indicative of motion using the second layout;

determining that the plurality of first resolution bounding boxes overlap with the second resolution bounding box;

merging the plurality of first resolution bounding boxes and the second resolution bounding box to generate a single box encompassing areas defined by the plurality of first resolution bounding boxes and the second resolution bounding box; and detecting motion of a single object based on the single box.

16. The method of claim 15, wherein the plurality of first resolution bounding boxes are generated by:

comparing block sum values of respective pixel blocks in the first layout to a threshold value;

identifying motion blocks based on the comparing; and performing connected component analysis to join adjacent motion blocks to define sizes of respective first resolution bounding boxes.

17. The method of claim 15, wherein the first resolution is less than the second resolution, the method further comprising:

identifying a non-overlapping bounding box in the first layout not overlapping with bounding boxes in the second layout; and including the non-overlapping bounding box in final motion detection results.

18. The method of claim 15, wherein the first resolution is less the second resolution, the method further comprising:

identifying a non-overlapping bounding box in the second layout not overlapping with bounding boxes in the first layout; and discarding the non-overlapping bounding box from final motion detection results.

19. The method of claim 15, further comprising:

generating at least one grayscale representation of the image, wherein the first and second layouts are defined from the at least one grayscale representation.

20. The method of claim 15, further comprising:

receiving the image in response to motion detected by an infrared sensor.

* * * * *

UNITED STATES PATENT AND TRADEMARK OFFICE
CERTIFICATE OF CORRECTION

PATENT NO. : 11,803,973 B1
APPLICATION NO. : 18/172803
DATED : October 31, 2023
INVENTOR(S) : Xu et al.

It is certified that error appears in the above-identified patent and that said Letters Patent is hereby corrected as shown below:

In the Drawings

Sheet 15 of 15, Fig. 13, reference numeral 1200, Line 1, delete "1200" and insert --1301-- therefor On sheet 15 of 15, Fig. 13, reference numeral 1202, Line 1, delete "1202" and insert --1302-- therefor On sheet 15 of 15, Fig. 13, reference numeral 1204, Line 1, delete "1204" and insert --1304-- therefor On sheet 15 of 15, Fig. 13, reference numeral 1206, Line 1, delete "1206" and insert --1306-- therefor On sheet 15 of 15, Fig. 13, reference numeral 1208, Line 1, delete "1208" and insert --1308-- therefor On sheet 15 of 15, Fig. 13, reference numeral 1210, Line 1, delete "1210" and insert --1310-- therefor On sheet 15 of 15, Fig. 13, reference numeral 1212, Line 1, delete "1212" and insert --1312-- therefor In the Specification In Column 7, Line 66, delete "210," and insert --212,-- therefor In Column 8, Line 3, delete "MCI" and insert --MCU-- therefor In Column 8, Line 11, delete "210." and insert --212.-- therefor In Column 8, Line 24, delete "204" and insert --200-- therefor In Column 14, Line 36, delete "1300" and insert --1301-- therefor In Column 14, Line 37, delete "1300" and insert --1301-- therefor Signed and Sealed this
Thirteenth Day of August, 2024

Katherine Kelly Vidal
*Director of the United States Patent and Trademark Office*

CERTIFICATE OF CORRECTION (continued)
U.S. Pat. No. 11,803,973 B1

In Column 14, Line 38, delete "1300" and insert --1301-- therefor

In Column 14, Line 41, delete "1300" and insert --1301-- therefor

In Column 14, Line 47, delete "1300" and insert --1301-- therefor

In Column 14, Line 52, delete "1300" and insert --1301-- therefor

In Column 14, Line 57, delete "1300)." and insert --1301).-- therefor

In Column 14, Line 60, delete "1300" and insert --1301-- therefor

In Column 17, Line 26, after "less", insert --than--

In the Claims

In Column 20, Line 22, in Claim 18, after "less", insert --than--